Patented Oct. 6, 1931

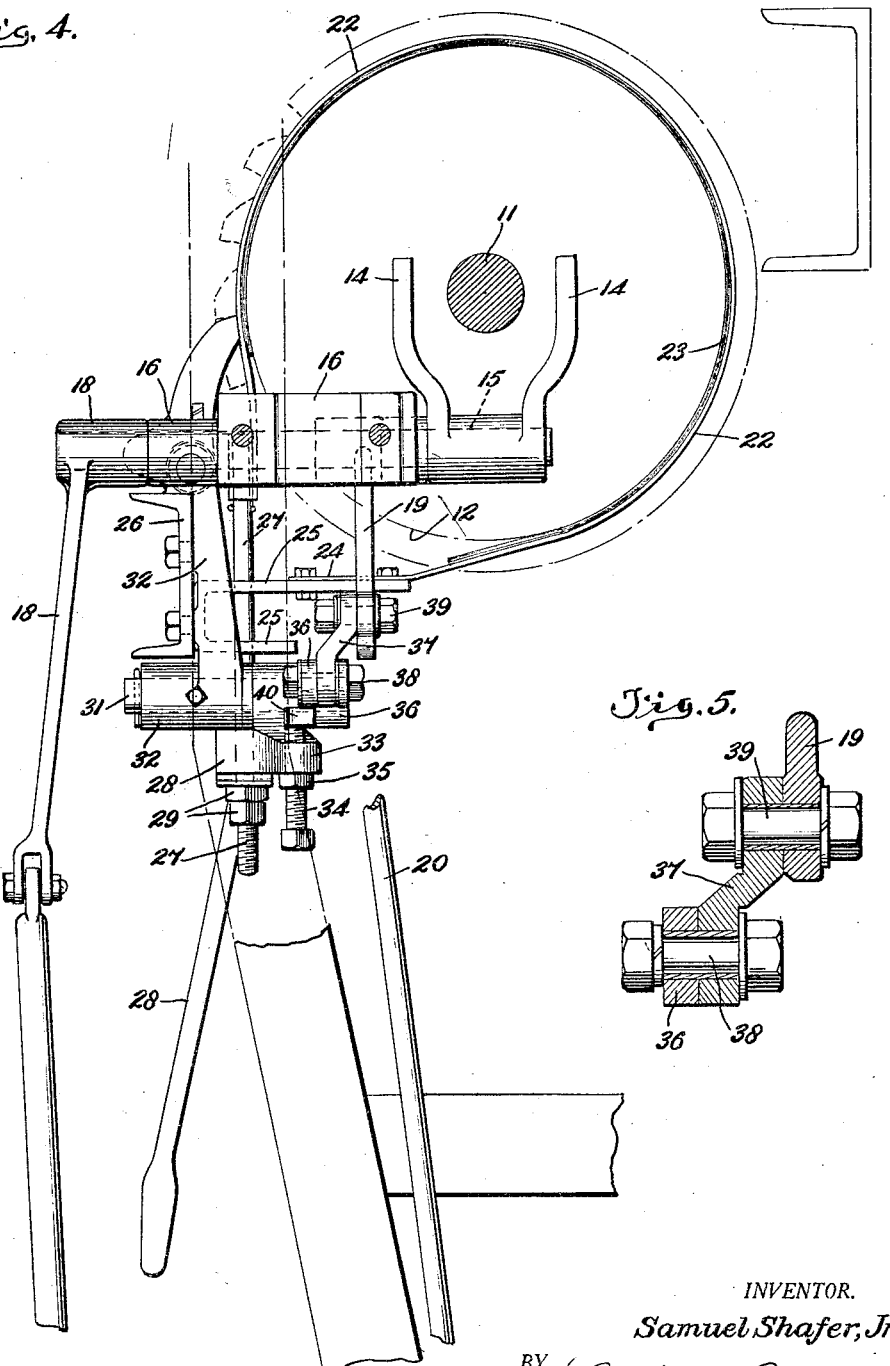

1,826,289

UNITED STATES PATENT OFFICE

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN

CONCRETE MIXER

Application filed January 17, 1929. Serial No. 333,074.

This invention relates to concrete mixers and more particularly to an automatic brake release for such apparatus, and has for one of its objects to provide a device of this character which will be simple in construction, comparatively inexpensive to manufacture, and more efficient in use than those which have been heretofore proposed.

In certain types of concrete mixers it is customary to provide a power operated charging skip for the mixer drum which skip is elevated by means of a cable wound upon a suitable winding drum, which latter is driven from the engine or other source of power of the mixer. A clutch is commonly interposed between the source of power and the winding drum in order that the latter may be actuated at will, and the drum is also provided with a braking surface which is engaged by a suitable brake member usually in the form of an annular band.

In previous constructions it has been the common practice to so adjust the brake band upon the brake drum that it will exert sufficient friction thereon to hold the winding drum against rotation whenever the power transmitting clutch is disengaged and no means has been provided for releasing the brake band from the drum during the winding operation. It therefore follows that the lining of the brake band drags upon the friction surface of the winding drum during the time the power is applied and the skip elevating cable is being wound up, with the result that the wear upon the parts is excessive and they must be frequently renewed.

It is the principal object of the present invention to provide means whereby the braking member may be automatically released from engagement with the braking surface of the winding drum whenever the power transmitting clutch is engaged for the purpose of winding up the skip cable, and to insure the re-engagement of the brake member with the drum surface when the clutch is disengaged. Provision is also made whereby the brake band may be released manually when the clutch is disengaged, in order that the skip may be lowered. Furthermore, the parts are automatically locked in each position through the use of a toggle mechanism, as will appear more fully below.

With the above and other objects in view, which will appear as the description proceeds, the invention consists in the novel details of construction and combinations of parts more fully hereinafter disclosed and particularly pointed out in the appended claims.

Referring to the accompanying drawings forming a part of this specification, in which like reference characters designate like parts in all the views:

Fig. 4 is an end elevational view of the parts shown in Fig. 2, as seen from the right of said figure, and Fig. 5 is an enlarged detail sectional view taken approximately on the plane indicated by the line 5—5 of Fig. 2, looking in the direction of the arrows.

Figure 1:
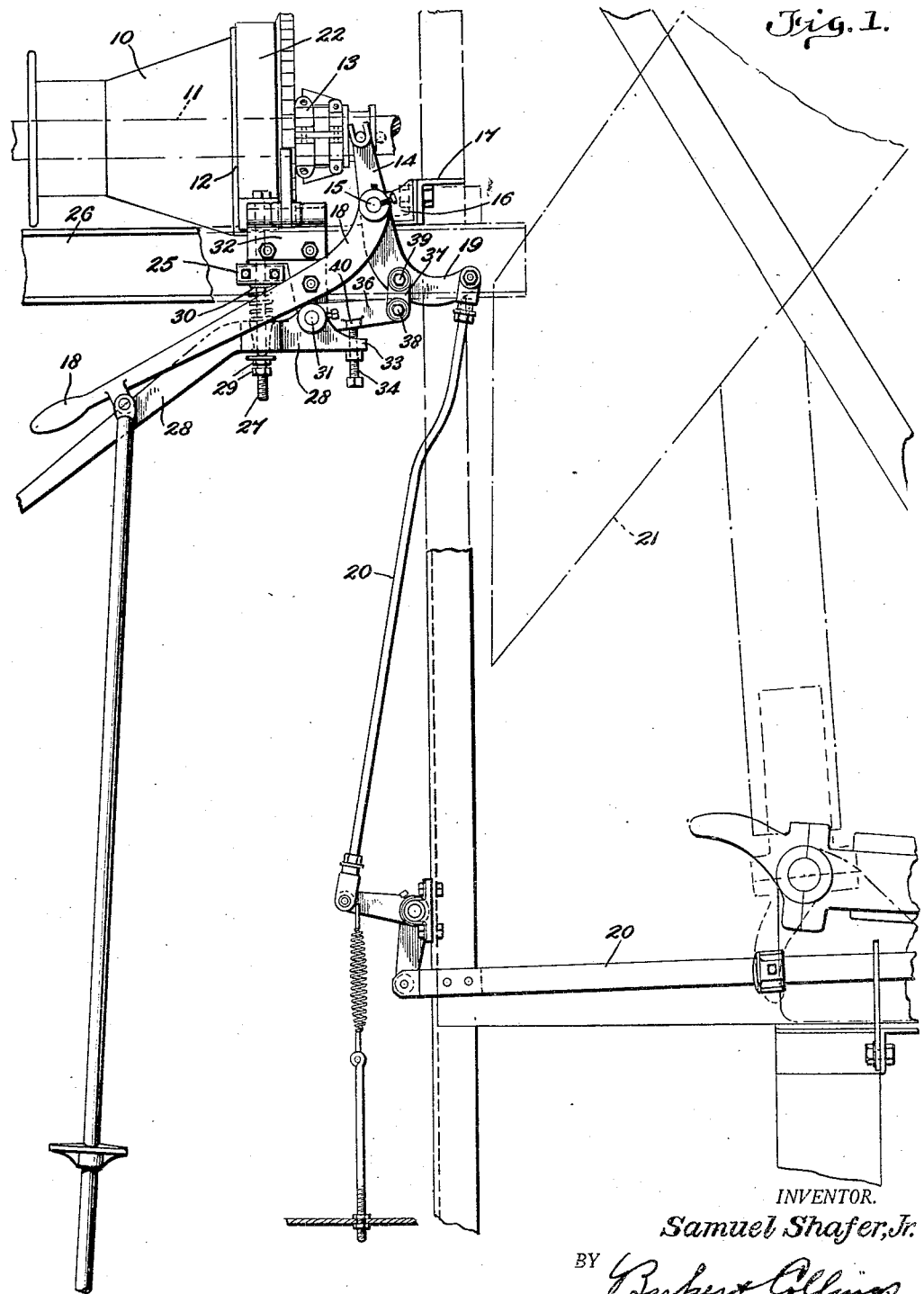
Fig. 1 is a fragmentary side elevational view of a concrete mixer with the present invention applied thereto.

Referring more particularly to the said drawings, 10 indicates diagrammatically a skip cable winding drum of a concrete mixer of well known type which is loosely mounted upon the shaft 11 and is provided with a braking surface 12. A suitable clutch 13 is mounted upon the said shaft 11 and is adapted to transmit power therefrom to the drum 10 when the parts are in the positions illustrated in Figs. 1 and 2.

The movable member of the clutch is adapted to be shifted by means of a shifting fork 14 which is rigidly carried upon a rock shaft 15 journaled in a bearing bracket 16 carried by a frame member 17 of the mixer and the said shaft 15 also carries a clutch-operating lever 18 by means of which the mechanism may be shifted by hand.

A third curved lever 19 is also rigidly carried by the rock shaft 15 and has a connection 20 by means of which the clutch may be automatically shifted from engaged to disengaged position when the charging skip 21 reaches the position shown in broken lines in Fig. 1. The levers 14, 18 and 19, as above stated, are all rigidly connected with the rock shaft 15, and the whole assembly may be referred to as the clutch operating mechanism.

Surrounding the braking surface 12 of the winding drum 10 is a brake band 22 having a suitable friction lining 23 for engaging the said braking surface 12, one end 24 of which band is rigidly connected to a supporting bracket 25 carried by the frame member 26. As will be clear from Fig. 4 the said band extends around the braking surface of the drum and its other end is connected to a vertically disposed rod 27 which slidably extends through the bracket 25 and passes through the brake operating lever 28, as clearly shown in Figs. 1, 2 and 3. The lower projecting end of the rod 27 is provided with adjusting nuts 29, by means of which the compression of a spring 30 may be controlled. Said spring 30, as will be clear from Figs. 2 and 3, surrounds the rod 27 and is interposed between the bracket 25 and the upper surface of the brake lever 28, thereby always exerting pressure upon the said brake lever which is transmitted through the adjusting nuts 29 to the rod 27 and to the brake band 22, thereby always tending to keep the brake lining 23 in frictional engagement with the braking surface 12.

The brake lever 28 is rigidly connected to a rock shaft 31 mounted in a bearing bracket 32 which is also carried by the frame member 26, as will be clear from the drawings. Said brake lever is provided with extension 33, in which is mounted an adjusting screw 34 having a lock nut 35, the purpose of which will appear more clearly below.

Loosely mounted on the rock shaft 31 is an intermediate lever or arm 36, the free end of which is connected to the clutch lever or arm 19 by means of a toggle link 37. As clearly shown in the drawings the said toggle link is pivotally connected to the intermediate lever 36 as at 38 and to the clutch lever or arm 19 at 39. The intermediate lever 36 is provided with a laterally projecting lug 40, the under surface of which is adapted to rest upon the upper projecting end of the adjustment screw 34 carried by the projection 33 of the brake lever 38.

The operation of the device is as follows:
Assuming that the parts are in the positions shown in Fig. 3, which is their normal position, with the clutch 13 disengaged, it will be noted that the brake lever 28 is somewhat downwardly inclined under the compression of the spring 30, whereby the lining 23 of the brake member 22 has been tightly applied to the braking surface 12 of the drum 10. It thus results that when the clutch is in this disengaged position the brake has been applied by the pressure of the brake spring 30.

Figure 2:
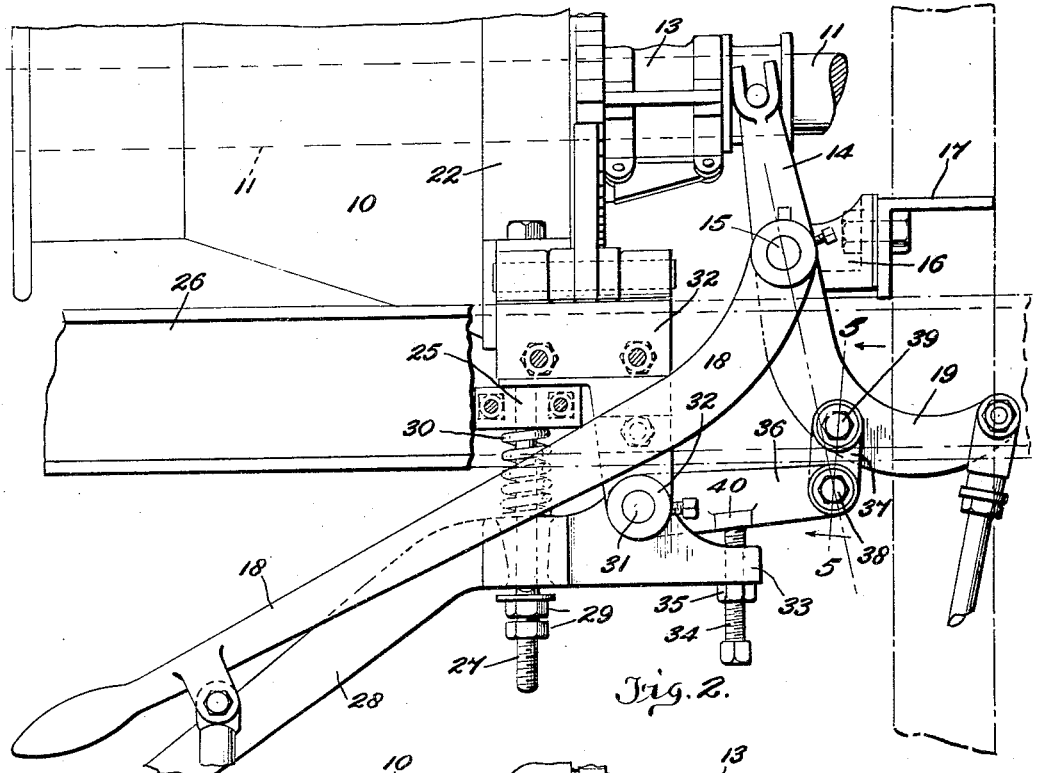
Fig. 2 is an enlarged side elevational view partly broken away showing the parts constituting the invention in the positions they assume when the clutch is engaged and the winding drum is operating.

If the clutch is now engaged through pulling down lever 18 to the position shown in Figs. 1 and 2, the arm 19 of the clutch operating assembly will be swung in a counter-clockwise direction to the position shown in Fig. 2 and will carry with it the toggle link 37 which latter movement will cause a depression of the intermediate link 36 as will be readily understood. This movement will be transmitted through the lug 40 of the intermediate link through the adjusting screw 34 and thence to the brake lever 28, with the result that this latter lever will be rocked in a clockwise direction against the spring 30, thereby relieving its pressure upon the brake band rod 27 and consequently relieving the friction of the brake lining upon the surface 12.

Figure 3:
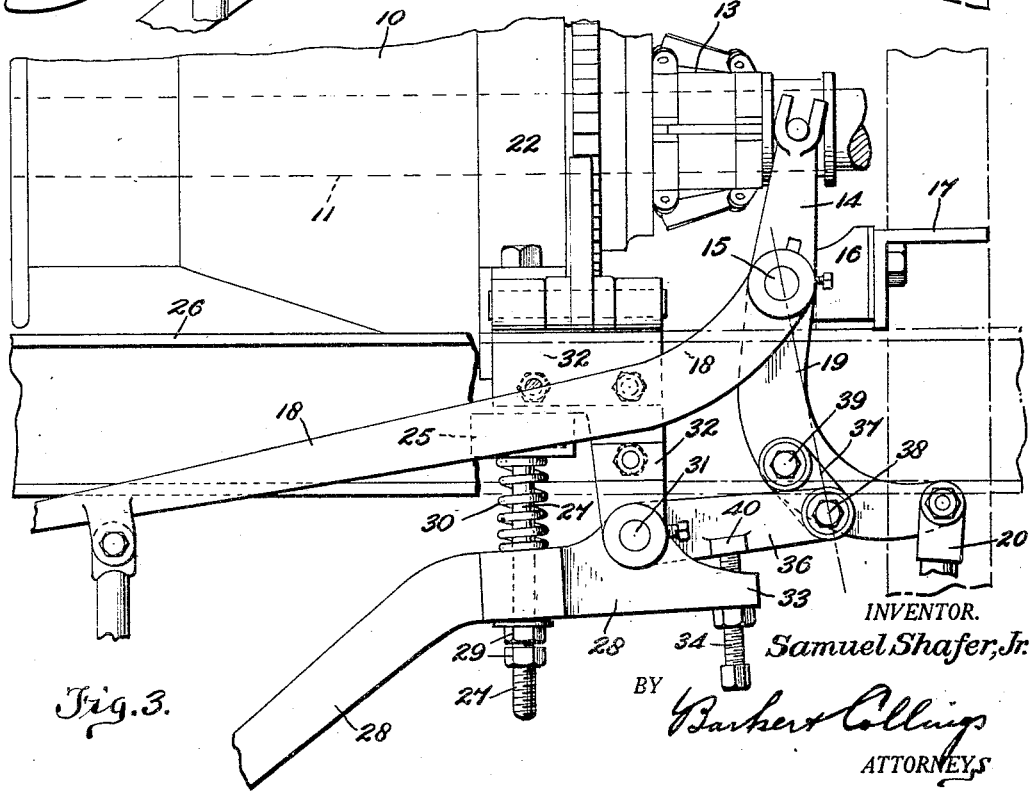
Fig. 3 is a view similar to Fig. 2 but showing the clutch disengaged and the brake applied.

It thus follows that whenever the clutch is engaged the brake will be released and, of course, when the parts are returned to their positions shown in Fig. 3 either through the manual operation of the clutch lever 18 or through the automatic operation of the connection 20, the spring 30 will be again allowed to apply the brake to the drum. It will be noted that, when the parts are in the position shown in Fig. 2, with the center of the pivot 39 swung to the right of a line drawn through the centers of the rock shaft 15 and pivot 38, they will be locked in such position, as any attempt to depress the brake lever 28, either by the spring 30 or by manual operation, will be resisted through the parts 34, 40, 36, 38, 37, 39, 19, 15, 14 and clutch 13. In other words any attempt to apply the brake when the clutch is engaged will only result in additional pressure being exerted upon the clutch plates without its being possible to bring the brake lining into engagement with the drum.

It will also be noted that the connection between the brake lever 28 and the intermediate lever 36 is non-rigid in that the lug 40 merely rests upon the projecting end of the adjusting set screw 34, so that it is possible to raise the brake lever 28 in a clockwise direction when the parts are in the positions shown in Fig. 3. It thus results that the brake may be released manually while the clutch is disengaged which, of course, is essential for the purpose of lowering the skip after it has reached its highest position and the clutch thrown out.

While one form of the invention has been illustrated and described, it is obvious that those skilled in the art may vary the details of construction as well as the precise arrangement of parts without departing from the spirit of the invention, and therefore it is not wished to be limited to the above disclosure except as may be required by the claims.

What is claimed is:

1. The combination with a rotatable element having a braking surface, a clutch for transmitting power to said element, a brake member for engaging said braking surface to prevent rotation of said element, a control lever for said clutch, and a control lever for said brake member, of an intermediate lever engaging said brake lever adapted to transmit motion to said brake lever in one direction only; and a toggle link connecting said clutch and intermediate levers.

2. The combination with a rotatable element having a braking surface, a clutch for transmitting power to said element, a brake member for engaging said braking surface to prevent rotation of said element, resilient means normally causing said brake member to engage said braking surface, a control lever for said clutch, and a control lever for said brake member, of an intermediate lever; a toggle link connecting said clutch and intermediate levers; and a non-rigid adjustable connection between said intermediate and brake levers, adapted to transmit motion to said brake lever in one direction only in opposition to the pressure of said resilient means, said connection permitting of independent manual operation of said brake lever to release said brake.

3. In a concrete mixer, the combination of a reversible cable winding drum provided with a braking surface; a clutch for transmitting power to said drum; a brake member for engaging said braking surface to prevent rotation of said drum; a manually operable lever for engaging and disengaging said clutch; a manually operable lever for applying and releasing said brake member to and from said braking surface; resilient means normally urging said braking member toward said braking surface; an intermediate lever operable by said clutch operating lever, and having an adjustable non-rigid connection with said brake operating lever for transmitting motion from said clutch operating lever to said brake operating lever only when the former is moved toward clutch-engaging position, whereby the brake member will be automatically released when the clutch is engaged; and automatically locking connections between said clutch operating lever and said intermediate lever for preventing movement of the latter and of the brake operating lever to brake applying position when the clutch is engaged.

SAMUEL SHAFER, Jr.